(12) United States Patent
Morin et al.

(10) Patent No.: US 8,051,765 B2
(45) Date of Patent: Nov. 8, 2011

(54) DISTRIBUTOR OF POWDERED PRODUCT WITH REMOVABLE RESERVOIR

(75) Inventors: Gilles Morin, Sainte Honorine du Fay (FR); Séverine Mih, Mayenne (FR)

(73) Assignee: SEB S.A., Ecully (FR)

( * ) Notice: Subject to any disclaimer, the term of this patent is extended or adjusted under 35 U.S.C. 154(b) by 907 days.

(21) Appl. No.: 11/768,331

(22) Filed: Jun. 26, 2007

(65) Prior Publication Data
US 2007/0295752 A1 Dec. 27, 2007

(30) Foreign Application Priority Data

Jun. 26, 2006 (FR) ...................................... 06 05700

(51) Int. Cl.
*A47J 31/06* (2006.01)
(52) U.S. Cl. ....................................................... 99/285
(58) Field of Classification Search .................. 99/295, 99/285, 289 R; 177/205; 222/23, 132, 145.1, 222/179.5, 501; 241/3, 30, 100, 285.2
See application file for complete search history.

(56) References Cited

U.S. PATENT DOCUMENTS

| | | | |
|---|---|---|---|
| 3,612,126 A | 10/1971 | Emmons et al. | |
| 4,779,521 A | 10/1988 | Brumfield | |
| 5,237,910 A | 8/1993 | Chigira | |
| 5,515,771 A * | 5/1996 | Smit | 99/280 |
| 6,698,624 B2 * | 3/2004 | Ufheil et al. | 222/153.14 |
| 2004/0169051 A1 | 9/2004 | Ufheil et al. | |
| 2005/0230343 A1 | 10/2005 | Huber | |
| 2006/0096469 A1* | 5/2006 | Morin et al. | 99/495 |
| 2007/0063079 A1 | 3/2007 | Ford | |

FOREIGN PATENT DOCUMENTS

| | | |
|---|---|---|
| DE | 1162518 | 2/1964 |
| FR | 2478456 | 9/1981 |
| GB | 2364994 A1 | 2/2002 |

* cited by examiner

*Primary Examiner* — Duc Nguyen
*Assistant Examiner* — Mark Woodall
(74) *Attorney, Agent, or Firm* — Browdy and Neimark, PLLC

(57) ABSTRACT

A distributor of powdered product, the distributor having a case, a reservoir removably installable in a housing formed in the case, the reservoir having a distribution orifice and being adapted to contain the powdered product and to be installed in the housing by a vertical translation movement, and elements for locking the reservoir in an intended position in the housing, with associated elements for confirming that the reservoir is correctly positioned inside the housing, elements for confirming including a switch that is responsive to the position of the reservoir in the housing and that forms part of an operating control of a machine associated with the distributor.

18 Claims, 4 Drawing Sheets

DISTRIBUTOR OF POWDERED PRODUCT WITH REMOVABLE RESERVOIR

BACKGROUND OF THE INVENTION

The present invention relates to a distributor, or dispenser device, for pulverulent, or powdered, products comprising a removable reservoir for storing a product in pulverulent, powder, ground, or granular form, which will be referred to herein as powder form or a powdered product, such as ground coffee, tea, chocolate, etc., for preparation of a brewed, or infused, beverage, the product being adapted to be used with an appliance for preparation and distribution of such beverages.

An appliance for preparation and distribution of hot beverages, for example starting from ground coffee, generally comprises a cold water reservoir, an electric pump, a boiler and a brewing, or infusion, head providing a chamber adapted to receive a certain quantity of ground coffee in order to inject therein a predetermined quantity of hot water coming from the boiler, the resulting beverage being then directed towards a collecting container, such as a cup or carafe. At the end of the brewing cycle, the brewing head must be opened in order to be able to introduce a new ground coffee dose after having evacuated the grounds previously brewed. The ground coffee is conveyed to the brewing chamber from a dispenser, or distributor, of the product in powder form. These appliances require a regular filling of the reservoir of the dispenser, an operation that requires time and considerable care on the part of the user, especially when access to the reservoir is in a small space.

To minimize these disadvantages, a solution is described in the French patent document FR 2 713 906 relating to a grounds dispenser for an automatic coffee machine comprising a grounds reservoir positioned in a removable manner in a corresponding seat formed in the case, or housing, of the machine. The grounds reservoir comprises proportioning, or dosing, blades rotated by an electric motor in the housing, the dispensing orifice being closed by halting of the blades in a given position, the blades having dimensions corresponding to those of the dispensing orifice that the blades border. The reservoir is held in place in a seat inside the case of the machine by a bayonet attachment system. Such an attachment system is not suitable for installation of the reservoir in a deep receiving housing of the case and presents also the disadvantage of requiring a rotational movement of the reservoir, which is not always convenient to accomplish with a well filled reservoir.

Another solution is disclosed in U.S. Pat. No. 5,341,961, where the distributor includes a ground coffee reservoir removably mounted with respect to a dosing device. The reservoir is held in place within the distributor by an attachment finger having a spring traversing the case of the distributor and coming to bear in a bolt provided on a lateral wall of the reservoir. The user must grasp the end of the finger and pull laterally to compress its spring to allow the installation of the reservoir in its housing, the same manual manipulation being necessary when it is desired to extract the reservoir. This solution is, certainly, simple and is suitable for a simple dosing device, but it presents the disadvantage of not giving any information as to the correct installation, or positioning, of the reservoir inside the distributor, a poor installation of the reservoir being able to cause malfunctions of the distributor. It presents, moreover, the disadvantage of requiring a difficult manipulation by the user who must, with one hand, pull laterally on the finger while, with other hand, he must manipulate the reservoir at the same time, all while trying to find the good orientation of this latter.

The European patent document EP 1 453 018 discloses a machine adapted to distribute beverages from a distributor of a fluid product contained in a removable reservoir. The reservoir is put in place, then locked on a horizontally sliding plate on the distributor, the plate being provided with a window for reception of a receptacle opening. This removable reservoir proves to be not very easily manipulatable, the user having to screw it on thoroughly to make sure of the correct installation of both reservoirs side by side inside the machine.

The European patent document EP 0 516 168 discloses an automatic distributor of beverages prepared with a device for feeding powdered material contained in storage units removably mounted in supports inside the distributor. Each storage unit includes a dosing screw to distribute the powdered product through a distribution orifice, the screw having an end for coupling to a motor located outside its support. For mounting in the support, each storage unit includes in its lower part protuberances cooperating with slits of its support. Switches detect the installation of each unit when it is locked with respect to its support. Nevertheless, the assemblage of such a storage unit in the distributor is difficult to accomplish because, for example, it is necessary to remove a part of the case to gain access to its support. Then, to allow it to be driven by the motor, the coupling of the storage unit must be aligned with the axis of the motor, the storage unit being then slipped horizontally into its support until engagement.

All of the above-cited documents are incorporated herein by reference.

BRIEF SUMMARY OF THE INVENTION

The present invention remedies the disadvantages described above and provides a distributor of powdered product having a removable reservoir which can be installed easily and securely inside the distributor, while being easy to gain access to and being able to be withdrawn easily from the distributor.

The invention also provides a safety device to prevent the functioning of a distributor if the removable reservoir of powdered product is not correctly positioned, while being blocked in it operating position, allowing a simple and economical construction, and being dependable in operation.

The invention also provides a distributor of powdered product with a removable reservoir adapted to be installed, locked and then unlocked easily with respect to its housing within the distributor, without imposing any construction constraint on the whole distributor.

According to the invention, there is provided a distributor of powdered product including a case, a reservoir removably mounted in a housing formed in the case, said reservoir containing the powdered product and having a distribution orifice, wherein the distributor comprises locking means associated with means for confirmation that the reservoir is correctly positioned by vertical translation inside an open housing of the case, the means for confirmation operating a switch for control of operation.

The distributor according to the invention provides thus a removable reservoir adapted to cooperate with locking means to fix it in position when it is installed in a housing provided for this purpose inside its case. The case presents an open housing, it being understood that the housing is open at its upper end and closed at its lower end that forms a support for the reservoir, this housing thus being directly accessible from the outside to accept the removable reservoir. The installation of the reservoir in its housing is advantageously effected by introducing it through the open end of the housing of the case and allowing it to undergo a vertical translation downwards, which already requires less effort on the part of the user, the reservoir assuming its position naturally by simple descent into the housing under the influence of its weight.

Also according to the invention, the locking means are in touch, or operative association, with the means for confirmation of the correct installation of the reservoir in its housing inside the distributor, these means including a switch to control the operation of the distributor when it detects that the reservoir is correctly positioned and fixed in its housing inside the case. These means for confirmation are preferably monitoring means linked to a control for starting the distributor.

When it arrives at the end of its path of vertical descent to the bottom of the housing, the reservoir is automatically locked and an indication of its correct installation is transmitted by a switch of the monitoring means of the distributor. Thus, the removable reservoir of the distributor of the invention is advantageously installed and blocked in position during its installation into the housing inside the case, operation under good conditions of the distributor being assured by a detection of the presence of the reservoir correctly installed and maintained in this position inside the distributor.

Preferably, the locking means are means for automatic engagement cooperating with latching elements having an appropriate form located on the side of the reservoir.

Such locking means with automatic engagement already allow a quick installation of the reservoir in the case of the distributor, the attachment being made at the end of descent of the reservoir into the case of the distributor, without additional manipulation on behalf of the user. Formed, or shaped, elements arranged on the side of the reservoir allow the bottom of the housing to be unobstructed for more compactness in the vertical direction and/or to allow the arrangement of means for driving, from the bottom, a tool, such as dosing blades, that acts inside the reservoir.

Advantageously, the distributor comprises unlocking means operated from outside of the case.

This assures convenient use, the removable reservoir being already accessible from the outside of the case, an unlocking action being exerted also from outside the case, preferably at the same side thereof as that receive the removable reservoir, allowing the reservoir to be unblocked with one hand and to be extracted with the other hand.

Preferably, the locking means include at least one hook and the reservoir has at least one latching element formed to provide quick engagement with the hook which blocks the reservoir during its installation in the housing, and the hook is rendered inactive by the action of an external lever of the unlocking means.

Such an element for quick engagement can include, for instance, a protuberance or a hollow formed on the external surface of the reservoir, coming to engage automatically with the locking hook during insertion of the reservoir into its housing inside the case. The hook thus automatically fixes the reservoir inside the case of the distributor, the installation and locking being then accomplished intuitively by the user, which is convenient more particularly for deep housings or housings having locking devices concealed by the case and not visible from the outside.

According to the invention also, unlocking is effectuated by a control action performed by the user on an external lever thus allowing deactivation, by simply pressing on the lever from the outside, of the locking hook located inside the case of the distributor. Such a locking device arranged in the case of the distributor presents the advantage of being very compact, dependable and simple to operate, while being protected by the case of the distributor.

Advantageously, the reservoir is installed by vertical translation inside the housing, which is open at the upper part of the case and the external lever is arranged close to the reservoir on the same side of the case.

The installation of the reservoir inside its housing in the case is made by a vertical translation downwards, which requires a lesser effort on the part of the user, the reservoir taking its proper place naturally by simple descent in the housing under the influence of its weight. This solution allows the ergonomics of the operation of unlocking to be improved, the user being better able to coordinate his movements for extraction of the reservoir and pressing on the control lever, without being annoyed by other parts of the distributor or its support.

Preferably, the quick engagement element is a protuberance having a lateral wall protruding from the outer lateral surface of the reservoir and having a lower insertion end and an upper support end, and locking is effectuated by the force of an elastic restoring, or biasing, means.

During the descent of the reservoir, the insertion end of the lateral protuberance comes first in contact with the hook which is pushed aside by the protuberance, advantageously formed with a radius of curvature or a chamfer facilitating the movement of the hook. The hook follows then the lateral wall of the protuberance during the vertical insertion movement of the reservoir to come finally to become installed on the support end where it is maintained in position locked by the action of the restoring spring. The protuberance thus plays the role of a guide cam for the hook in its movement aside during introduction until locking of the reservoir.

Advantageously, the hook is supported to pivot around a horizontal axis.

A pivotal movement of the locking hook is preferred in embodiments of invention because this provides a good amplitude of output movement for a small amplitude of input movement.

Preferably, the hook cooperates with the upper support end of the protuberance and is prolonged by a horizontal arm having an end with a vertical return, or upright.

The horizontal arm of the hook pivots around an axis perpendicular to the direction of displacement of the reservoir, the vertical upright of the horizontal arm allowing an easy operation by a simple vertical pressure from the upper part of the case.

Advantageously, the reservoir includes two diametrically opposite protuberances cooperating with two hooks the horizontal arms of which are linked together and include a common vertical upright.

This solution allows a better fixing of the reservoir, which is thus supported on both sides, while being of a simplified operation owing to the common upright of both hooks.

Advantageously, the end of the vertical upright is linked to an ejection pedal mounted to pivot around a horizontal axis located at the upper part of the case.

In a variant, the unlocking of the hook is performed by a pressure exerted directly on the vertical upright. According to another simplified embodiment, the vertical upright is linked to an ejection pedal mounted to pivot around a horizontal axis in the upper part of the case while being urged to a neutral position by a return spring, which then maintains the lever in a locking position.

Preferably, the reservoir includes indexing means for correctly positioning the reservoir relative to the housing of the case.

This facilitates installation, by the user, of the reservoir in its housing and guarantees at the same time the correct positioning of the reservoir, a necessary condition for proper functioning of the distributor.

Advantageously, the confirmation means include a rod, or stem, carried by the reservoir for actuating an operation control switch.

Such a rod includes a salient, or protruding, end arranged to close the contacts of a micro-switch in order to carry out a confirmation and/or control operation and allow the triggering of an alarm and/or a display of information for the user of the distributor. The rod can be arranged on the lateral surface of the reservoir or on the bottom surface thereof.

In an advantageous variant of the invention, the distributor includes a device for ejection of the reservoir.

Such an ejection device allows the reservoir to be extracted more easily from its housing.

Advantageously, the ejection device comprises at least one ejection piece mounted to a return, or biasing, spring at the bottom of the housing of the case and coming into contact with the bottom of the reservoir when the latter is installed in the case.

The installation of the reservoir in its housing is therefore effected by depressing the piece and compressing its spring, the reservoir being then blocked in this position by the locking device. During unlocking, the biasing spring associated with the ejection piece expands to push the reservoir upwardly. The reservoir then protrudes out of its housing so that it can be more easily grasped by the user in order to be extracted and removed from the case.

Preferably, the ejection piece acts on an operation control switch.

This simplifies the structure of the reservoir, the piece belonging to the case of the distributor and thus assuring confirmation of the presence of the reservoir correctly installed in the housing.

In a variant of the invention, the reservoir contains ground coffee and the distributor has dosing means allowing defined quantities of ground coffee to be dispensed.

According to another variant of the invention, the reservoir contains coffee beans and the coffee machine has means for grinding or milling the grains and then dispensing the resulting ground coffee.

A distributor with removable reservoir according to invention can therefore be used equally with reservoirs containing of the ground coffee or coffee beans and therefore with different types of machines.

A distributor with removable reservoir according to the invention finds its application advantageously in an automatic machine for preparation of beverages. Such an automatic machine includes means supplying a predetermined quantity of liquid into an infusion chamber that receives the powdered product from the distributor according to the invention, as well as means allowing evacuation of the resulting infusion product, or beverage, from the infusion chamber towards a container, such as a cup. The distributor according to invention allows a secure functioning of the coffee machine by transmitting information indicating the presence of the removable reservoir in the machine in its correct locked position, as well as information indicating the absence of the reservoir, while allowing the machine to produce several types of beverages from interchangeable, removable reservoirs.

BRIEF DESCRIPTION OF THE DRAWINGS

The invention will be better understood from the following detailed description together with the accompanying drawings.

DETAILED DESCRIPTION OF THE INVENTION

A distributor of product in powder form will be described within the framework of an automatic coffee machine, the distributed product in powder form being in this case ground coffee. A coffee machine containing a dispenser of product in powder form according to the invention comprises elements that are already known for this type of machine and can incorporate the details described in the international patent document WO 9912457, the disclosure of which is incorporated herein by reference, insofar as concerns the device for tamping coffee grounds in the brewing chamber and for ejection of used coffee grounds, such as "pucks" formed in espresso machines. Such a machine is in particular adapted to ensure an adequate temperature of the water delivered into the brewing chamber and to carry out the compaction of the ground coffee inside the brewing chamber. The coffee obtained after brewing in the brewing chamber is conveyed outside the machine into a collecting container, such as for example described in the international patent document WO 9912456, the disclosure of which is incorporated herein by reference.

The distributor of product in powder form described comprises moreover dosing means, in particular a hub rotating dosing blades, making it possible to deliver defined quantities of ground coffee, these means comprising known elements and being able to incorporate the details described in the French patent document FR 2 713 906, the disclosure of which is incorporated herein by reference.

Figure 1:
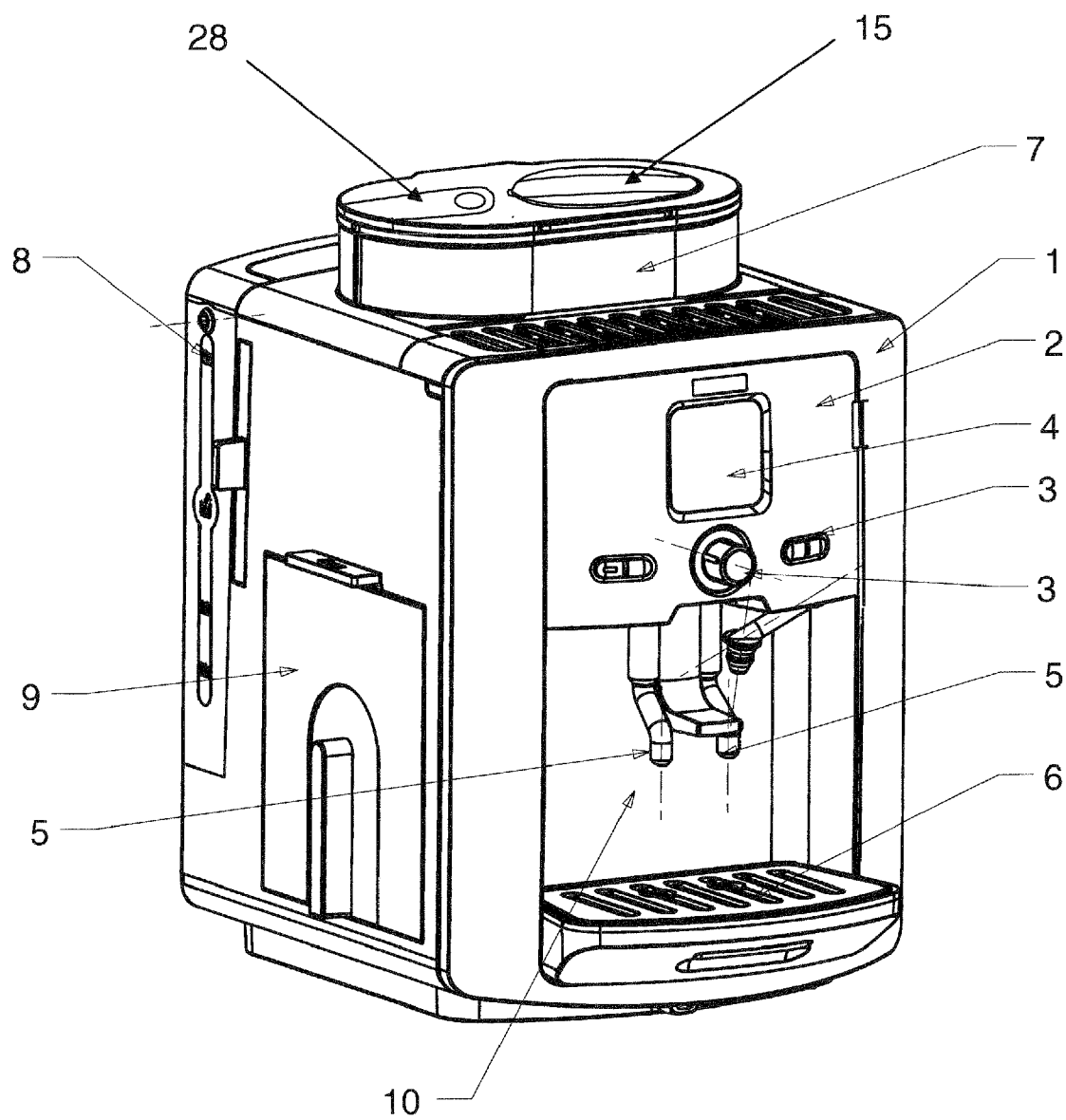
FIG. 1 is an elevational perspective view of an espresso coffee machine containing a distributor with removable reservoir according to the invention.

A coffee machine having a distributor according to the invention, as shown in FIG. 1, has an external shell 1 with a front external face 2 and a front recessed face 10. Front external face 2 is equipped with control buttons 3 and a display 4 to present information for the users during operation of the machine. Nozzles, or spigots, 5 for delivering coffee, e.g., espresso, are located in a front recess of the shell, in front of face 10 and above a grate 6 and a pan, under grate 6, for receiving coffee or water that has not been poured into a cup. The espresso coffee machine has moreover a water reservoir 8. As is conventional, the machine has a brewing chamber (not visible) and a grounds recovery receptacle 9, accessible from a lateral face of the machine, for the evacuation of grounds discs, or "pucks", ejected from the brewing chamber.

Such an espresso machine is capable of producing numerous cups of coffee in the course of several cycles of preparation without the user having to intervene to supply coffee or water or to evacuate grounds following every preparation cycle.

Figure 3:
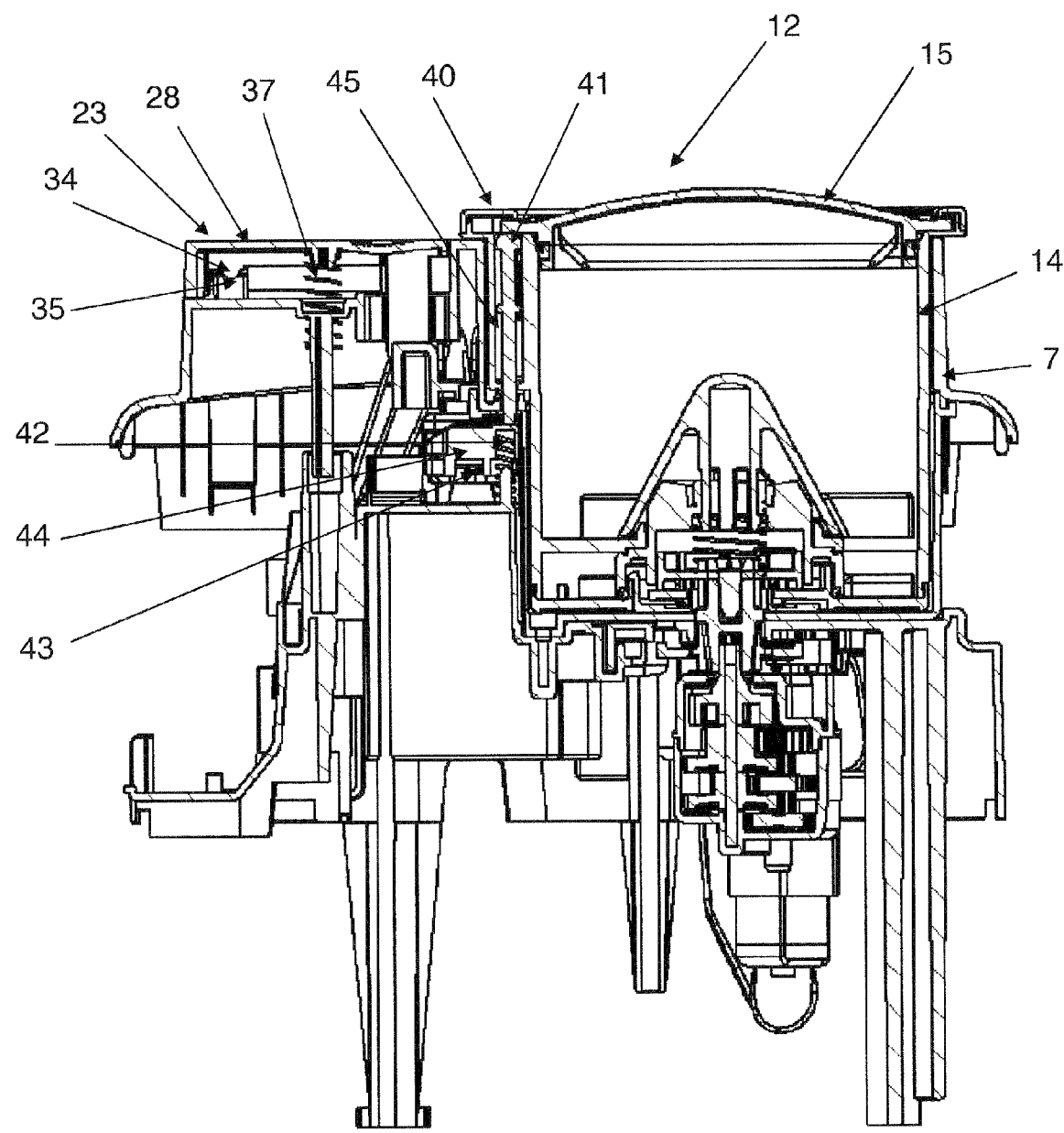
FIG. 3 shows an elevational, cross-sectional view of the upper part of the coffee machine with the reservoir installed in the distributor.

The upper part of the machine includes a distributor 12 with removable reservoir 14, shown in greater detail in FIG. 3, for the ground coffee. This reservoir and means according to invention for locking and confirmation of the presence of said reservoir are incorporated in a compartment protected by a case 7.

Figure 2:
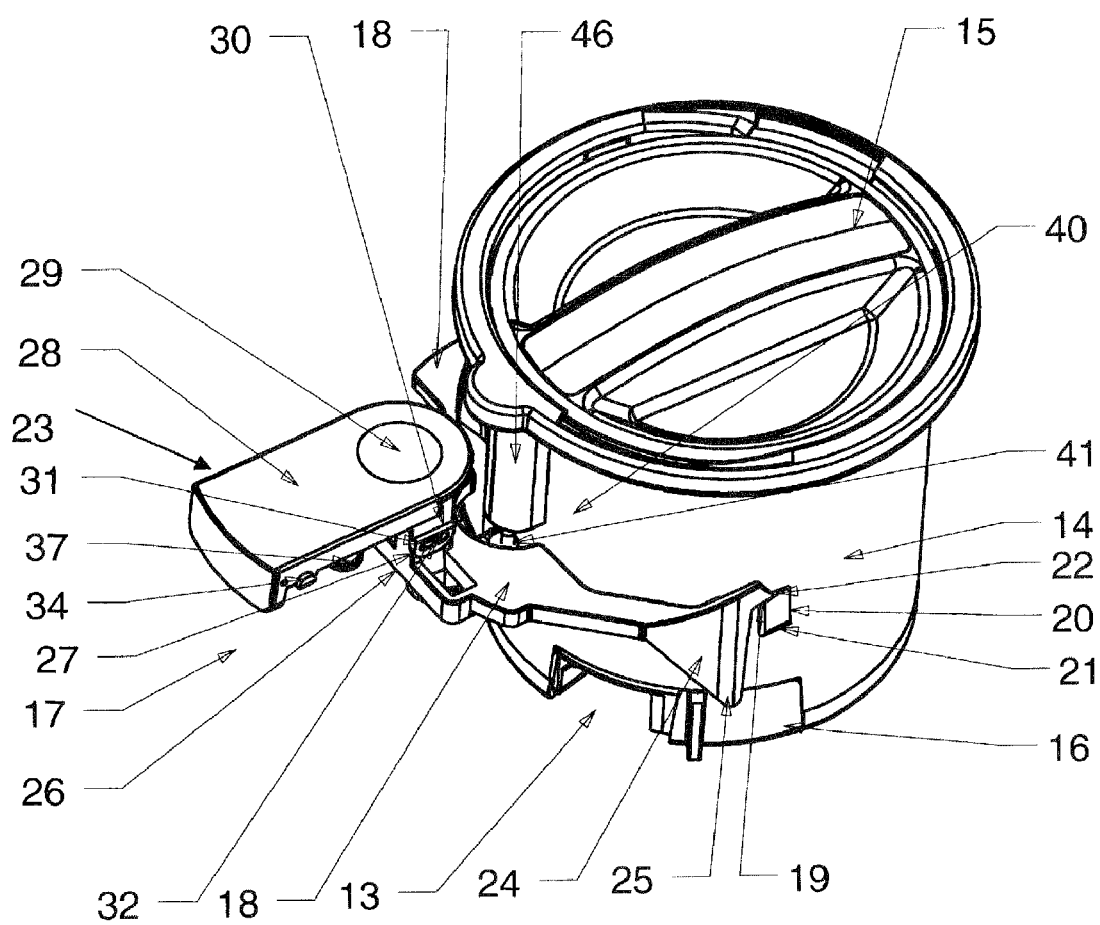
FIG. 2 is a view in perspective, partially from the top, of an embodiment of the reservoir and a mechanism for locking and confirmation of the presence of the reservoir according to a first embodiment of the invention, the case of the distributor being removed to facilitate viewing.
Figure 4:
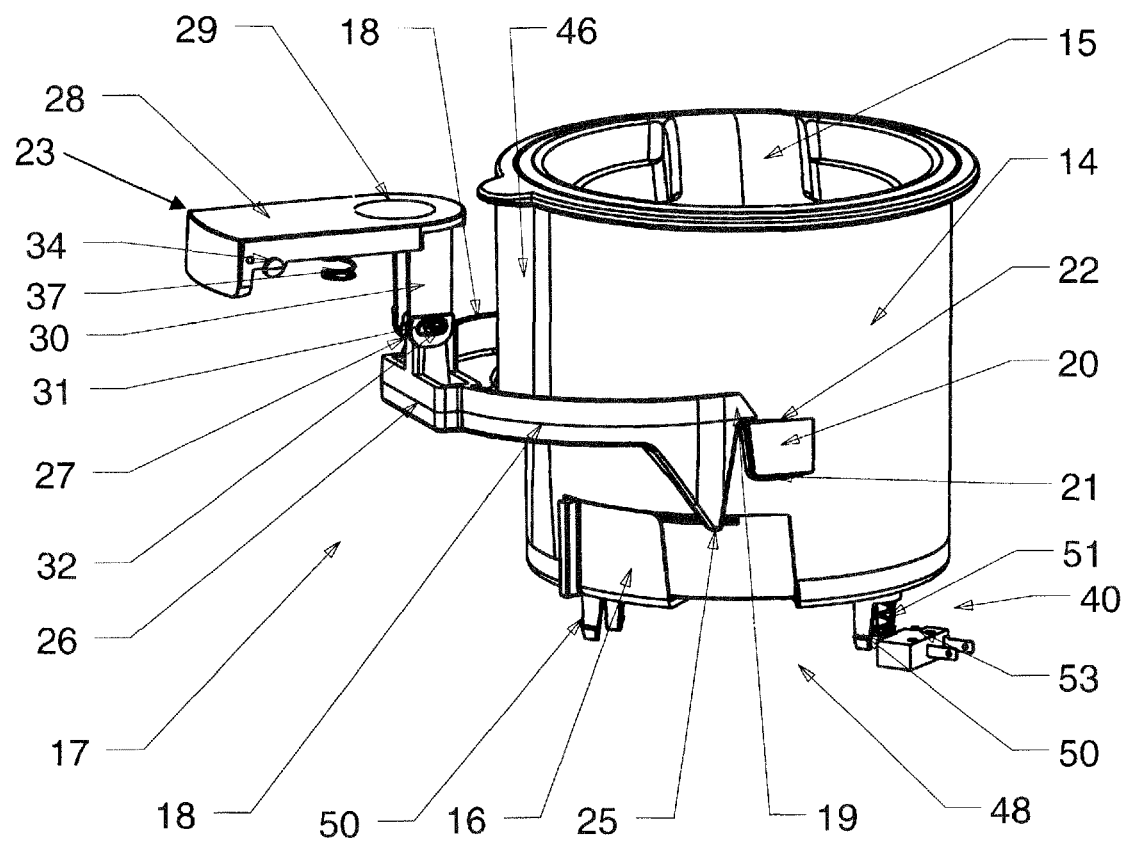
FIG. 4 is a view in perspective of the reservoir and the mechanism for locking and confirmation of the presence of the reservoir according to a second embodiment of invention, the case of the distributor being removed to facilitate viewing.

In FIGS. 2 and 4, the case 7 has been removed to show essential parts of locking means 17. Distributor 12 for ground coffee includes a reservoir 14 of generally cylindrical form including a distribution orifice 13 in its lower part and a device for blocking this orifice, such as a shutter 16.

FIGS. 2 and 4 show locking means 17 according to invention, which comprise two horizontal arms 18 connected together, partially encircling reservoir 14 and placed at one side thereof. Each horizontal arm 18 ends in a hook 19 intended to cooperate with a protuberance 20 located on the lateral outer surface of reservoir 14. Each hook 19 is prolonged vertically downwards by a triangular skirt 24 having, at the level of the internal surface of its tip 25, a cylindrical lug led to turn in a corresponding cylindrical orifice, or recess, provided for this purpose inside case 7. The lugs define the horizontal pivot axis of arms 18.

Both horizontal arms 18 form a fork 26 ending at a vertical return, or upright, 27. Fork 26 is coupled at the end of vertical upright 27 to an external actuation lever 23 of locking means 17. In the example shown in the drawings, external lever 23 is an ejection pedal 28 having a generally L-shaped form and including a horizontal pressing plane, or surface, 29 extended downwardly by a vertical fork, or stirrup, 30 attached to vertical upright 27 of fork 26. Each leg of fork 30 includes an oblong slot 31 allowing sliding with respect to a respective lug 32 formed in the upper end of vertical upright 27, one such lug being formed at each side of upright 27 and only one of these lugs being visible in FIGS. 2 and 4.

More particularly FIG. 3 shows that pedal 28 includes, at the front end of its surface, remote from surface 29, two lateral protuberances 34 of generally cylindrical form pivotally supported in ears 35 of corresponding form inside case 7. Pivoting of pedal 28 is effected by manually pressing on surface 29 in opposition to the force of a return spring 37 which is, in example shown, a compression spring having one end fixed to case 7 and other end held in external lever 23.

FIGS. 2 and 4 show the particular form of protuberances 20, each having a lower insertion end 21 and an upper support, or retention, end 22. Lower end 21 has a rounded stop or chamfer to facilitate introduction of the reservoir, notably to facilitate cooperation between each hook 19 and its associated protuberance 20 during insertion of the reservoir. Support end 22 has a planar horizontal surface allowing the planar end of hook 19 to bear correctly on end 22 when reservoir 14 is correctly installed.

Thus, during installation of the reservoir 14 by a vertical translational movement into its housing inside case 7, protuberances 20 deflect hooks 19 of locking means 17 so that hooks 19 follow the outline of associated lateral walls of protuberances 20. As soon as hooks 19 arrive at the upper part of protuberances 20, they return to their initial orientation, in response to the return force of spring 37 of the pedal 28, and rest on support ends 22 of protuberances 20. To release the reservoir, the user presses on pedal 28, specifically surface 29, which compresses spring 37 and pivots arms 18 to move hooks 19 away from protuberances 20. The user can now extract the reservoir from the case 7 of the distributor.

According to the invention also, the distributor includes means 40 for confirming the presence, and correct insertion, of removable reservoir 14 inside the housing provided for this purpose in case 7. In the example represented in FIGS. 2 and 3, confirmation means 40 include a rod 41 carried by reservoir 14, while in the example represented in FIG. 4, means 40 include a piece 50 carried by case 7, either rod 41 or piece 50 being adapted to actuate, by a translatory downward movement, a switch 43 or 53, respectively, connected to the electrical control circuit of the machine.

FIG. 3 shows more particularly the upper part of the coffee machine, notably case 7 in a housing of which is installed the removable reservoir 14 closed by a cover, or lid, 15, as well as the means 40 for confirmation of the presence of said reservoir 14, the cover 15 being shown in locked position with respect to the reservoir. According to the example of FIG. 3, confirmation of the presence of the removable reservoir 14 is accomplished by means of the rod 41 carried by reservoir 14. Rod 41 is mounted at the periphery of, and outside, reservoir 14, in a housing 45 allowing only a vertical movement of rod 41. In an advantageous version of the invention, rod 41 is movable with cover 15 and is in its low position only when cover 15 is correctly locked on reservoir 14.

The confirmation of the presence of reservoir 14 closed by its cover 15 requires at least one switch 43 operating in response to the position of rod 41 to indicate the presence of the reservoir and/or to allow or prevent starting of the coffee machine. This switch 43 is connected to the electronic control card of the coffee machine and to display 4.

Various micro-switches and electronic circuits are known to accomplish this operation and allow the triggering of an alarm and/or a display of information for the user of the coffee machine and they will not be described in greater detail herein.

Switch 43 works through a pedal 44, mounted to a restoring, or biasing, spring 42, the position of pedal 44 being directly related to that of rod 41. The low, or depressed, position of rod 41 corresponds to the possibility of starting the coffee machine and to a first position of pedal 44, and the high, or raised, position of rod 41 provides a warning, such as an illuminated light on the display and/or acts to prevent starting of the machine, and corresponds to a second position of pedal 44. Pedal 44 operates by pivoting between two positions around a horizontal axis of rotation perpendicular to the axis of rod 41.

Such a safety device can advantageously be connected to a sound indicator functioning as an alarm and/or to a display to alert the user to a problem.

In a second embodiment of the invention shown in FIG. 4, the device for confirmation of the presence of reservoir 14 in its housing includes the switch 53 carried by case 7 and having an elastic contact tongue actuated by a piece 50. Piece 50 is mounted to slide vertically against the action of a compression spring 51, inside case 7, by being moved by the weight of reservoir 14 when it is installed in the housing provided inside case 7.

Each piece 50 and its associated spring 51 are received in a recess, or orifice, at the bottom of the housing and piece 50 is displaced vertically partially out of its recess by the action of spring 51 when reservoir 14 is removed from its housing.

In an advantageous manner in this embodiment, case 7 includes two diametrically opposed pieces 50 slidably mounted at the bottom of the housing for receiving the reservoir 14 and forming an ejection device 48. In the absence of reservoir 14, pieces 50 are pushed vertically by respective biasing springs 51 projecting through the orifices provided in the bottom of the housing for receiving reservoir 14 in case 7. During the installation of the reservoir in the housing inside case 7, the bottom of reservoir 14 comes to bear on pieces 50, causing pieces 50 to be pushed down by the weight of reservoir 14. Moreover, during his descent, one of the pieces 50 comes to push the elastic tongue of switch 53 laterally, closing its contacts and thus transmitting to the electronic card of the machine an indication relating to the presence of the reservoir in case 7. Reservoir 14 is moreover locked automatically during its installation by locking means 17. During unlocking, in response to a pressure on pedal 28, hooks 19 of locking means 17 are made inactive, and pieces 50, under the influence of their springs 51, push reservoir 14 upwardly, lifting it by about 5 mm, for example, thus facilitating gripping of the reservoir by the user in order to extract it from case 7.

Reservoir 14 includes a longitudinal projection 46 that can cooperate with a mating groove in case 7 to allow the indexation of the reservoir relative to its housing inside case 7, which housing has a form and dimensions close to those of the outline of the reservoir, allowing its easy introduction, with play, into the upper part of case 7.

In operation, the user begins by installing reservoir 14 by introducing it into the upper part of case 7 so that it assumes a predetermined position, aided by longitudinal projection 46. Locking means 17 act to fix reservoir 14 in the correct position in case 7, the user having only to push reservoir 14 downwards until it comes to abut against the bottom of its housing in case 7. Thus, during the descent of the reservoir into its housing, protuberances 20 move hooks 19 aside and allow rod 41 or piece 50 to operate contacts of the switch 43 or 53, respectively, confirming thus that the reservoir 14 is correctly installed in case 7. Once the reservoir 14 has arrived in position, when it abuts the bottom of the housing, hooks 19 of the locking device return to their neutral, or normal, position to lock reservoir 14 in place by bearing upon protuberances 20 under the biasing action of spring 37 of pedal 28. In this locked position, switch 43 or 53, respectively, indicates in the machine the presence and correct positioning of reservoir 14, so that the machine is ready to make coffees. When the user wants to extract reservoir 14, for example to replace it with a different reservoir, or for cleaning or refilling, the user must press on pedal 28, causing hooks 19 to move clear of protuberances 20 and allowing extraction of the reservoir by the user. The switch 43 or 53 no longer being actuated, display 4 of the machine indicates by an illuminated indicator light, or by a text message, even an by an audible signal, the absence of reservoir 14.

Other variants and embodiments of the invention can be provided without departing from the framework of the accompanying claims.

Thus, use could be made an electromechanical device including for instance an actuating rod of a control button of an electromagnet which, during the installation of the reservoir in the case of the machine, would allow a jaw to be pushed laterally to lock the reservoir while at the same time transmitting in the machine an indication of the presence of the reservoir.

In addition, reservoir 14 and case 7 could be equipped with a mechanism for automatically opening shutter 16, for example a mechanism as described in copending U.S. application Ser. No. 11/763,737, filed on Jun. 15, 2007, the disclosure of which is incorporated herein by reference.

Further, as shown generally in FIG. 3, reservoir 7 may be equipped with dosing blades that are rotated by a motorized drive assembly installed in case 7 below the housing, as also described in the above-cited copending U.S. application.

This application relates to subject matter disclosed in French Application number FR 06 05700, filed on Jun. 26, 2006, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A distributor of powdered product, said distributor comprising a case, a reservoir removably installable in a housing formed in said case, said reservoir having a distribution orifice and being adapted to contain the powdered product and to be installed in said housing by only a vertical translation movement, and means for locking said reservoir in an intended position in said housing, with associated means for confirming that said reservoir is correctly positioned inside said housing, said means for confirming comprising a switch that is responsive to the position of said reservoir in said housing and that forms part of an operating control associated with said distributor, and wherein said distributor further comprises means for unlocking said reservoir, said means for unlocking being positioned to be actuated from outside of said case, wherein said locking means are operative to prevent removal of said reservoir until said unlocking means are actuated.

2. The distributor according to claim 1, wherein said means for locking comprise latch means mounted on an outer surface of said reservoir and automatic engagement means adapted to cooperate with said latch means.

3. The distributor according to claim 1, wherein said means for locking comprise at least one hook, and latch means mounted on an outer surface of said reservoir to be engaged by said hook in order to lock said reservoir in the intended position, and said distributor further comprises an external lever operative to disengage said hook from said latch means.

4. The distributor according to claim 3, wherein said housing has an open top and said reservoir is insertable into said housing via said open top, and said external lever is located close to said reservoir.

5. The distributor according to claim 3, wherein said latch means comprise at least one protuberance having a lateral wall protruding from said outer surface of said reservoir and having a lower insertion end and an upper support end, and wherein locking of said reservoir in the intended position is effectuated by a force produced by an elastic biasing means.

6. The distributor according to claim 5, wherein said hook cooperates with said upper support end of said protuberance, and said locking means comprise at least one generally horizontally extending arm and an upright element, said arm having first and second opposed ends, with said hook being disposed at said first end and said upright element being disposed at said second end.

7. The distributor according to claim 5, wherein said hook is supported for pivotal movement about a horizontal axis.

8. The distributor according to claim 7, wherein said hook cooperates with said upper support end of said protuberance, and said locking means comprise at least one generally horizontally extending arm and an upright element, said arm having first and second opposed ends, with said hook being disposed at said first end and said upright element being disposed at said second end.

9. The distributor according to claim 8, further comprising an ejection pedal coupled to said upright element and mounted to pivot about a horizontal pivot axis at an upper part of said case and operable to move said hook out of engagement with said protuberance.

10. The distributor according to claim 8, wherein said at least one protuberance comprises two said protuberances on opposite sides of said reservoir, and said at least one arm comprises two said arms each cooperating with a respective one of said protuberances, and said two arms are connected together at said second ends.

11. The distributor according to claim 10, wherein said two arms have a common upright element, and further comprising an ejection pedal coupled to said common upright and mounted to pivot about a horizontal pivot axis at an upper part of said case and operable to move said hooks out of engagement with said protuberances.

12. The distributor according to claim 3, wherein said hook is supported for pivotal movement about a horizontal axis.

13. The distributor according to claim 1, wherein said means for confirming comprise a rod carried by said reservoir and adapted to operate the switch.

14. The distributor according to claim 1, wherein said reservoir comprises indexation means for placing said reservoir in the intended position with respect to said housing.

15. The distributor according to claim 1, further comprising a device for ejecting said reservoir from said housing.

16. The distributor according to claim 15, wherein said device for ejecting comprises at least one ejection piece and a biasing spring at the bottom of said housing, said piece being adapted to contact the bottom of said reservoir when said reservoir is in the intended position in said housing and said spring being adapted to resiliently apply an upward force to said piece.

17. The distributor according to claim 16, wherein said ejection piece is further adapted to act on the switch.

18. An automatic machine for preparation of beverages, said machine comprising: a distributor as defined in claim 1; means for preparing beverages from the powdered product; and an electronic control circuit connected to the switch.

* * * * *